United States Patent [19]

Pelegris

[11] Patent Number: 5,357,568
[45] Date of Patent: Oct. 18, 1994

[54] TELEPHONE LINE OVERVOLTAGE PROTECTION METHOD AND APPARATUS

[75] Inventor: Dimitris J. Pelegris, Mount Prospect, Ill.

[73] Assignee: Oneac Corporation, Libertyville, Ill.

[21] Appl. No.: 185,767

[22] Filed: Jan. 24, 1994

Related U.S. Application Data

[63] Continuation of Ser. No. 895,380, Jun. 8, 1992, abandoned.

[51] Int. Cl.$^5$ .......................... H02H 3/20; H02H 3/08
[52] U.S. Cl. ..................................... 361/119; 361/124; 379/412; 337/32
[58] Field of Search ............... 379/412, 413; 361/119, 361/124, 120; 337/32, 31

[56] References Cited

U.S. PATENT DOCUMENTS

| | | |
|---|---|---|
| 3,725,613 | 4/1973 | Allen et al. . |
| 3,852,539 | 12/1974 | DeLuca . |
| 4,039,763 | 8/1977 | Angner et al. . |
| 4,079,211 | 3/1978 | Janssen . |
| 4,095,163 | 6/1978 | Montague ........................ 323/8 |
| 4,156,838 | 5/1979 | Montague ........................ 323/8 |
| 4,254,442 | 3/1981 | Dijkmans et al. ................ 361/56 |
| 4,455,586 | 6/1984 | McCartney ..................... 361/91 X |
| 4,491,903 | 1/1985 | Montague ........................ 363/48 |
| 4,535,379 | 8/1985 | DeLuca et al. .................. 337/32 |
| 4,536,618 | 8/1985 | Serrano . |
| 4,539,617 | 9/1985 | Delaney et l. .................. 361/58 |
| 4,544,983 | 10/1985 | Anderson et al. ............... 361/119 |
| 4,586,104 | 4/1986 | Standler ........................ 361/91 |
| 4,729,055 | 3/1988 | Dorival ......................... 361/119 |
| 4,736,269 | 4/1988 | Amein et al. .................. 361/124 |
| 4,758,920 | 3/1989 | McCartney ..................... 361/119 |
| 4,876,621 | 10/1989 | Rust et al. ..................... 361/119 |
| 4,903,295 | 2/1990 | Shannon et al. ................ 379/412 |
| 4,939,619 | 7/1990 | Borkowicz et al. .............. 361/117 |
| 4,941,063 | 7/1990 | McCartney et al. ............. 361/119 |
| 4,944,003 | 7/1990 | Meyerhoefer et al. .......... 379/412 |
| 4,964,160 | 10/1990 | Traube et al. .................. 379/412 |
| 5,031,067 | 7/1991 | Kidd et al. .................... 361/119 |
| 5,101,317 | 3/1992 | Cwirzen et al. ................ 337/32 |
| 5,175,662 | 12/1992 | DeBalko et al. ............... 361/119 |
| 5,191,605 | 3/1993 | Brower ......................... 379/412 |
| 5,224,012 | 6/1993 | Smith .......................... 361/119 |

FOREIGN PATENT DOCUMENTS

9206523A1 4/1992 PCT Int'l Appl. .
2215538A 9/1989 United Kingdom .

Primary Examiner—James L. Dwyer
Assistant Examiner—Scott L. Weaver
Attorney, Agent, or Firm—Mason, Kolehmainen, Rathburn & Wyss

[57] ABSTRACT

A telephone line overvoltage protection method and device are provided. An overvoltage protection apparatus used with a pair of telephone lines includes first voltage clamping circuitry for clamping voltage signals on the lines at a first predetermined voltage potential; second voltage clamping circuitry for clamping voltage signals on the lines at a second predetermined voltage potential. The second voltage clamping circuitry includes filter circuitry for filtering the voltage signals when the voltage signals exceed the second predetermined voltage signals. The first voltage clamping circuitry is formed by a solid state protective device and a failure mode mechanism adapted for connecting the lines to ground responsive to increased temperature of the solid state protective device.

15 Claims, 3 Drawing Sheets

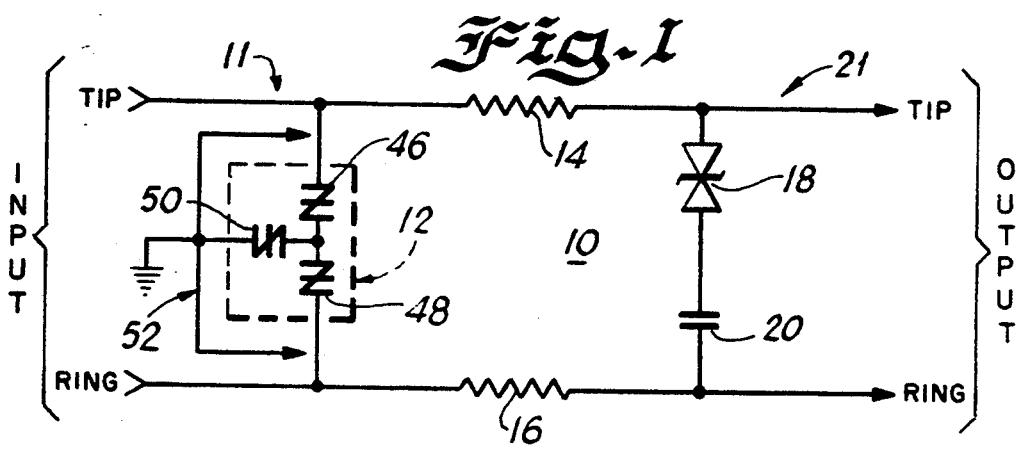
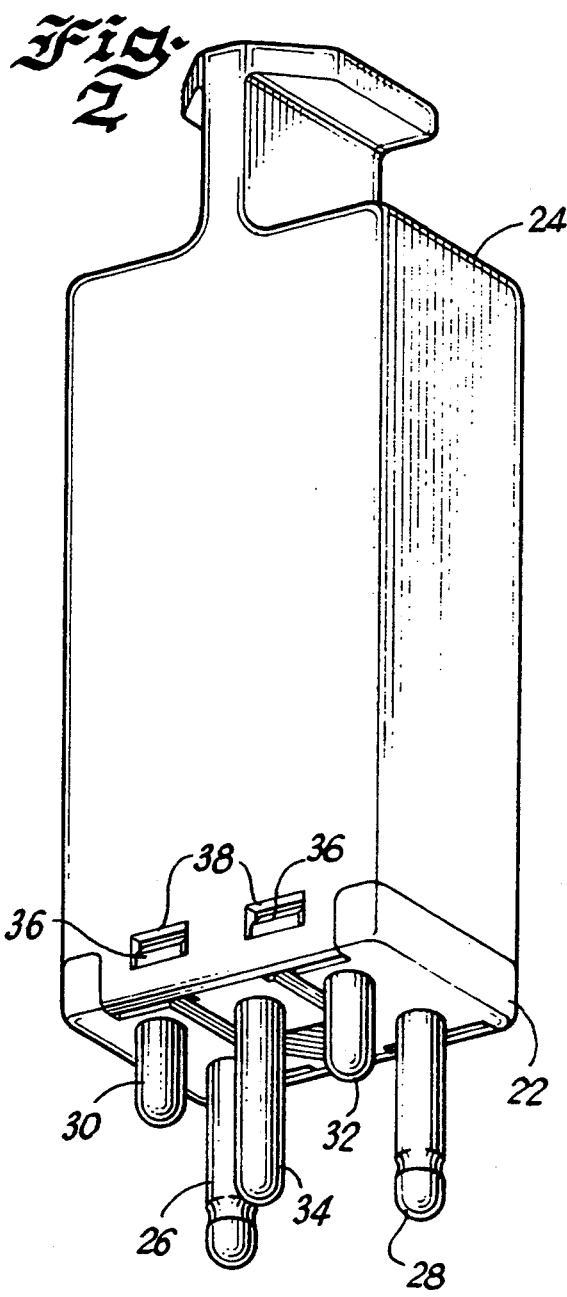
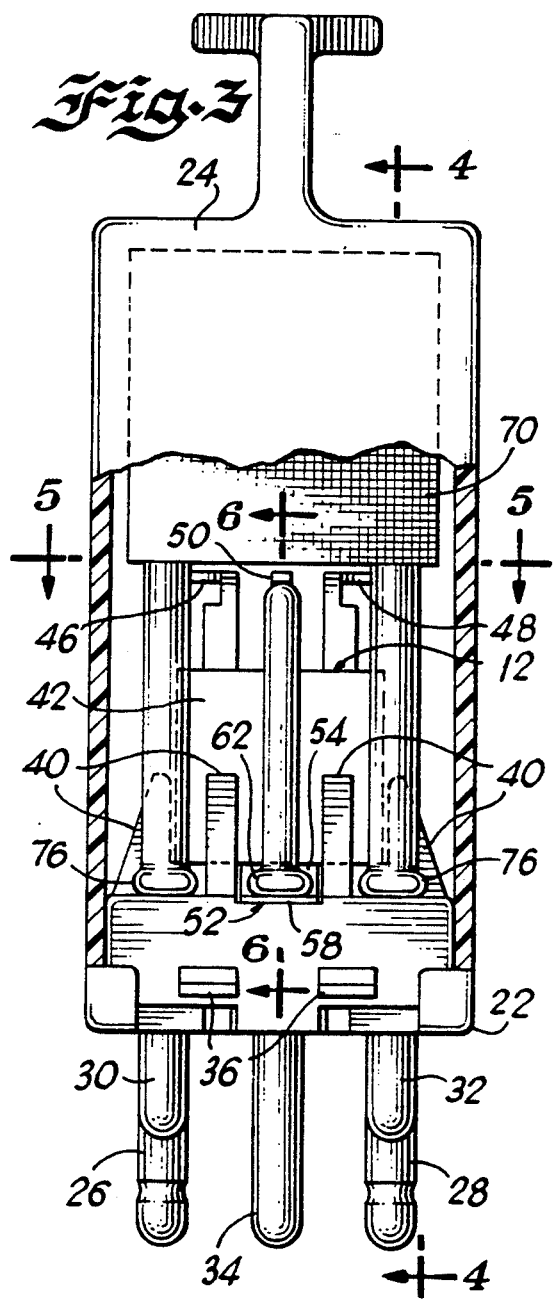

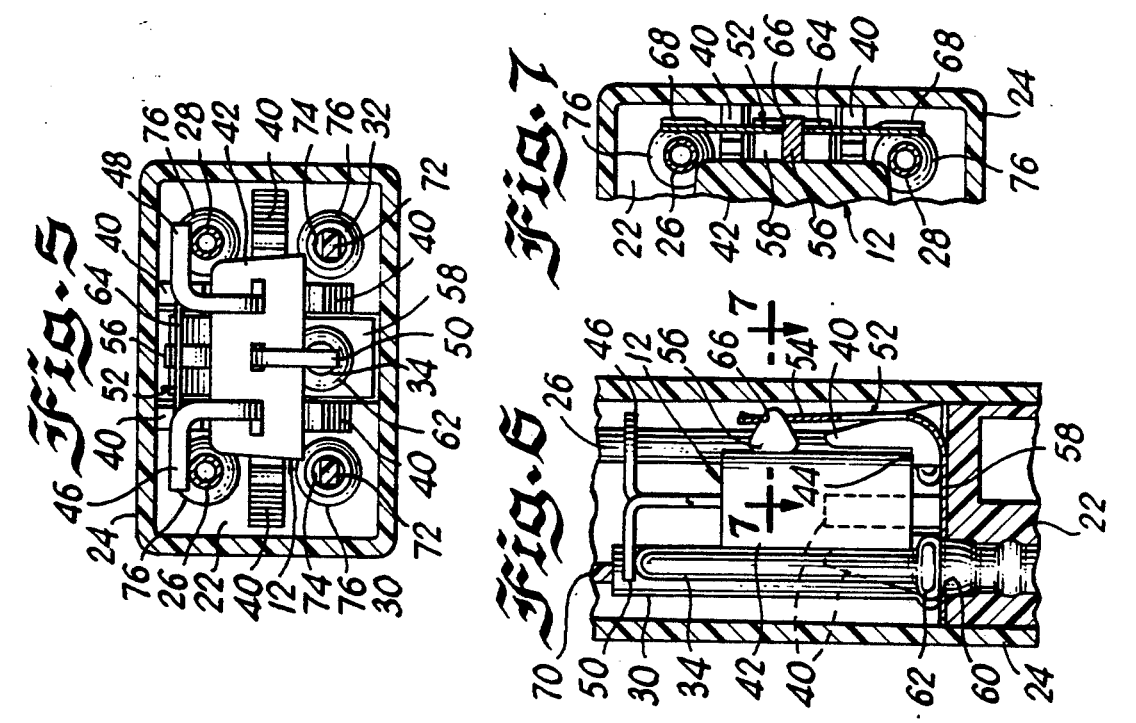
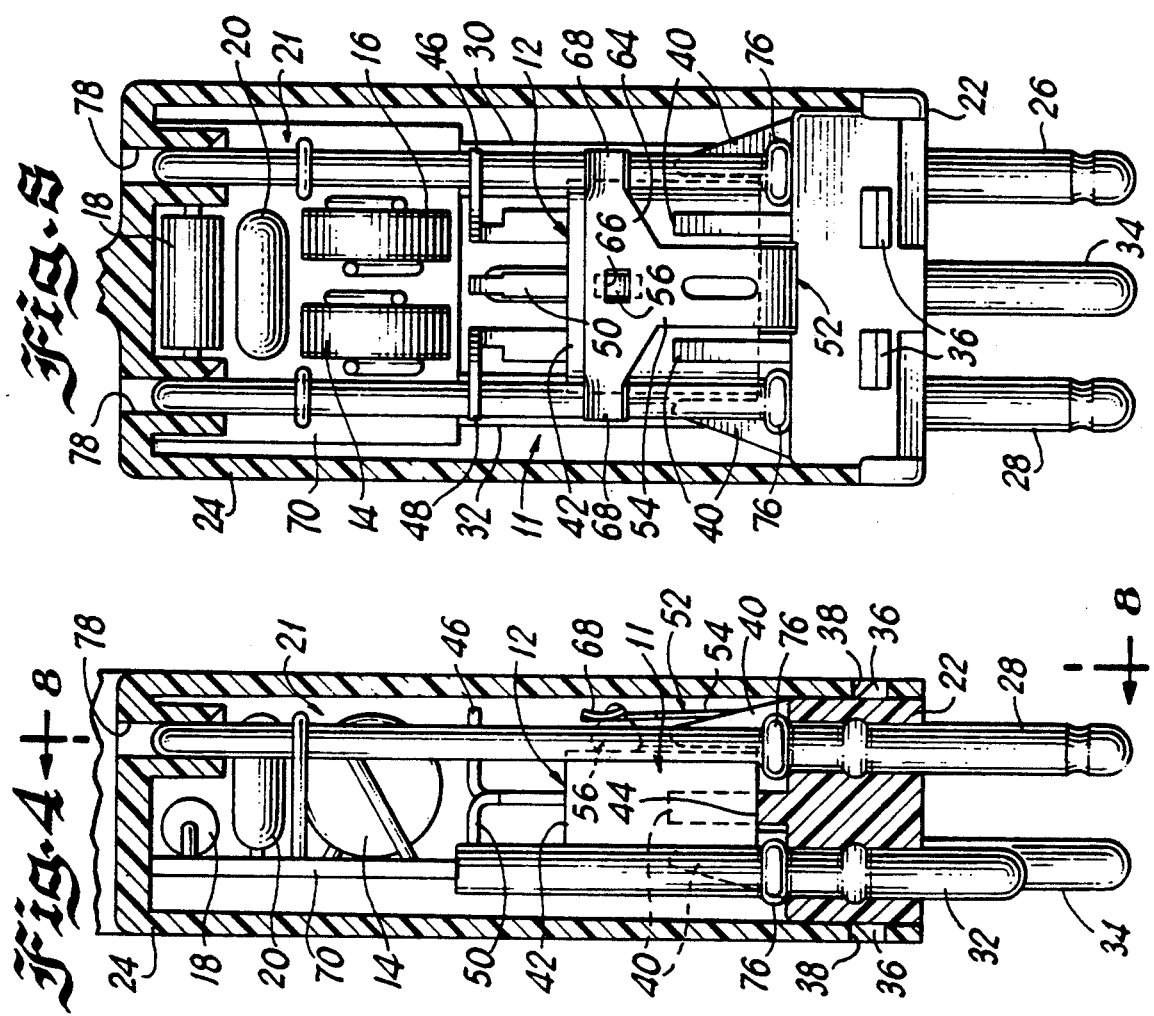

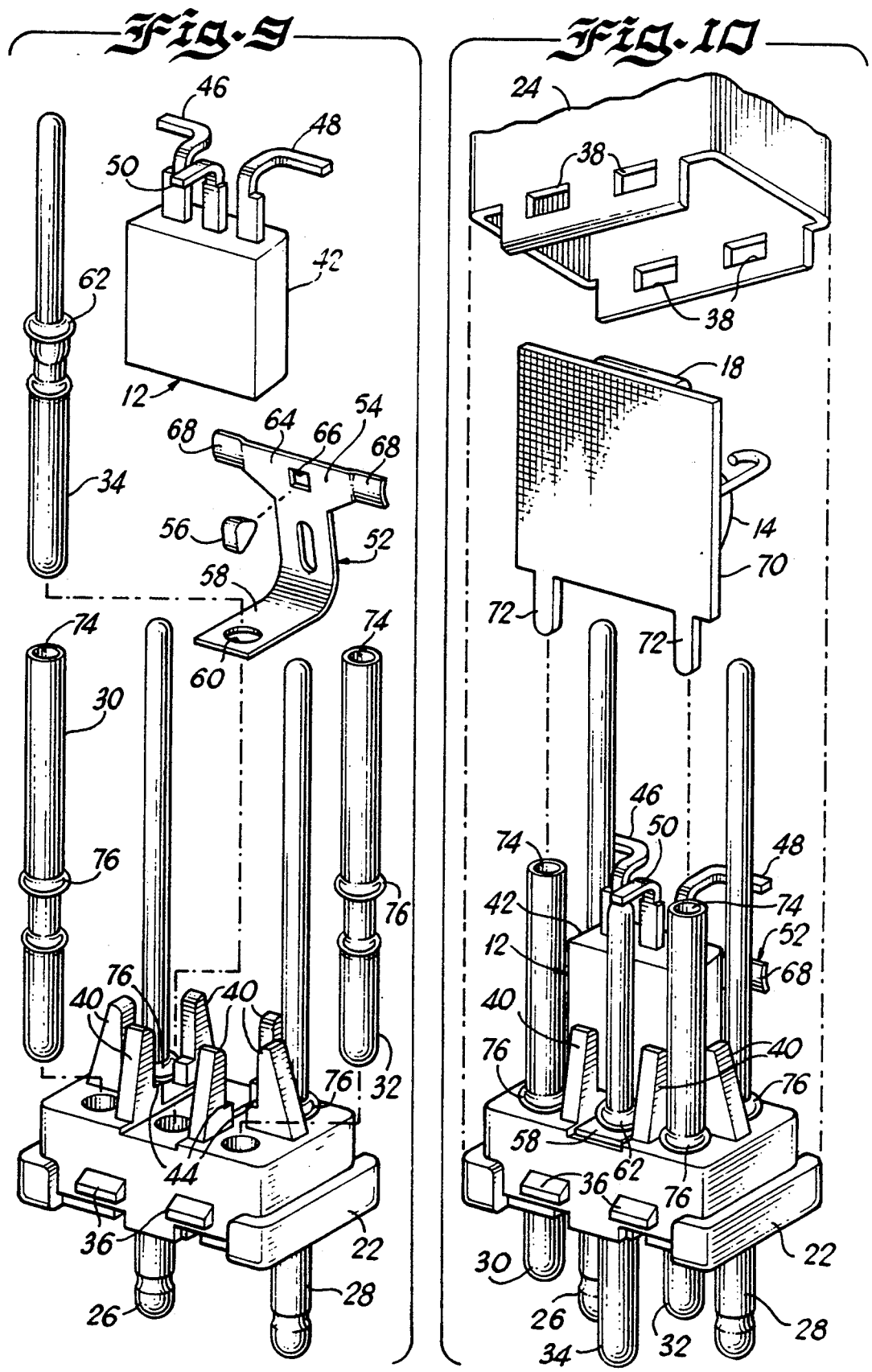

TELEPHONE LINE OVERVOLTAGE PROTECTION METHOD AND APPARATUS

This application is a continuation of application Ser. No. 07/895,380, filed Jun. 8, 1992 now abandoned.

BACKGROUND OF THE INVENTION

1. Field of the Invention

The present invention relates generally to telephone line overvoltage protection devices, and more particularly to an improved telephone line overvoltage protection method and apparatus.

2. Description of the Prior Art

Overvoltage protection devices are commonly used with telephone lines for protecting telephone equipment against hazardous voltages due to lightning or power surges. Overvoltage protection circuitry that overcomes many disadvantages of the prior art circuitry is disclosed in McCartney, U.S. Pat. No. 4,758,920, issued Jul. 19, 1988 and McCartney et al., U.S. Pat. No. 4,941,063, issued Jul. 10, 1990 and both assigned to the assignee of the present invention.

An inert gas filled protective device or gas discharge tube with electrodes inserted between TIP and RING INPUT connections often is used for protecting from hazardous voltages, for example, due to lightning and power surges. A significant disadvantage of the inert gas filled protective device or gas discharge tube is the relatively long response time delay as compared to a solid state device. However, known protective arrangements that utilize a solid state device do not provide balanced operation in a failure mode to shunt both the TIP and RING to ground. A need exists for a first protective device having a short response time delay and providing effective failure mode balanced operation.

Other problems with known protection devices generally effective for overvoltage noise and transient protection include the complexity, the difficulty and time required for manufacture and assembly.

SUMMARY OF THE INVENTION

Among the principal objects of the present invention are to provide an improved telephone line overvoltage protection device; to provide a telephone line overvoltage protection device facilitating improved reliability; and to provide a telephone line overvoltage protection device overcoming many of the disadvantages of known overvoltage protection devices.

In brief, the objects and advantages of the present invention are achieved by a telephone line overvoltage protection method and apparatus. An overvoltage protection apparatus used with a pair of telephone lines includes first voltage clamping circuitry for clamping voltage signals on the lines at a first predetermined voltage potential; and second voltage clamping circuitry for clamping voltage signals on the lines at a second predetermined voltage potential. The second voltage clamping circuitry includes filter circuitry for filtering the voltage signals when the voltage signals exceed the second predetermined voltage signals. The first voltage clamping circuitry is formed by a solid state protective device and a failure mode mechanism adapted for connecting the lines to ground responsive to increased temperature of the solid state protective device.

BRIEF DESCRIPTION OF THE DRAWING

The present invention together with the above and other objects and advantages may best be understood from the following detailed description of the embodiment of the invention illustrated in the drawing, wherein:

FIG. 1 is a schematic diagram representation of a telephone line overvoltage protection device constructed in accordance with the present invention;

FIG. 2 is a perspective view of the telephone line overvoltage protection device of FIG. 1;

FIG. 3 is an elevational view partly broken away of a telephone line overvoltage protection device of FIG. 1;

FIG. 4 is a sectional view of the telephone line overvoltage protection device viewed from the line 4—4 of FIG. 3;

FIG. 5 is a sectional view of the telephone line overvoltage protection device viewed from the line 5—5 of FIG. 3;

FIG. 6 is a sectional view of the telephone line overvoltage protection device viewed from the line 6—6 of FIG. 3;

FIG. 7 is a sectional view of the telephone line overvoltage protection device viewed from the line 7—7 of FIG. 6;

FIG. 8 is a sectional view of the telephone line overvoltage protection device viewed from the line 8—8 of FIG. 4;

FIG. 9 is a exploded perspective view of a portion of the telephone overvoltage protection device of FIG. 1 constructed in accordance with the present invention; and FIG. 10 is a similar view to FIG. 9 illustrating a base unit after being assembled with first overvoltage protection circuitry aligned for engagement with a printed wiring board carrying second overvoltage protection circuitry.

DETAILED DESCRIPTION OF THE PREFERRED EMBODIMENT

Referring now to the drawings, in FIGS. 1–11 there is illustrated a telephone line overvoltage protection device designated as a whole by the reference character 10 and constructed in accordance with principles of the present invention. Having reference to FIG. 1, the telephone line overvoltage protection device 10 includes first overvoltage protection circuitry generally designated 11 including a first solid state overvoltage protector device generally designated 12 connected between the TIP and RING INPUT connections. Second overvoltage protection circuitry generally designated 21 includes a resistor 14 connected in series with the TIP line, a resistor 16 connected in series with the RING line, a transient voltage suppressor 18 and a capacitor 20 connected between the resistors 14 and 16 series connected with the TIP and RING OUTPUT connections.

The solid state overvoltage device 12 is a bidirectional transient surge protector with a selected voltage clamping voltage for protecting from lightning, line transients and other high voltage spikes. Various commercially available devices can be used for the solid state overvoltage device 12, for example, such as, a balanced, triple sidactor part number P3403AB having a minimum breakover voltage rating of 300 volts and manufactured by Teccor Electronics, Inc. of Irving, Tex. Preferably the current limiting resistors 14 and 16 are positive temperature coefficient (PTC) resistors having a higher resistance value with higher current to provide a resettable fuse functional operation. Alternatively, resistors 14 and 16 are fusible resistors that open-circuit for current limiting at a predetermined temperature or corresponding current value.

Referring to FIGS. 2–10, a base unit 22 and a cover 24 together form a housing for the overvoltage protection device 10. Base unit 22 receives and positions TIP and RING INPUT pins 26, 28, TIP and RING OUTPUT pins 30, 32 and a ground pin 34 within corresponding apertures 26A, 28A, 30A, 32A and 34A arranged in a conventional configuration. Base unit 22 includes a plurality of wedges or fingers 36 received and retained in a corresponding aperture or opening 38 of the cover 24 for snap-fit engagement of the base 22 with the cover 24. Base unit 22 includes a plurality of upstanding arms 40 defining a cavity for slidingly receiving a main body portion 42 of the overvoltage protective device 12 until a recessed stop surface or ledge 44 is engaged. Overvoltage protective device 12 includes opposed electrodes 46 and 48 for electrical connection with TIP and RING INPUT pins 26, 28 and a centrally located electrode 50 for electrical connection with the ground pin 34.

As best shown in FIG. 9, apparatus generally designated 52 for balanced operation in a failure mode includes a fail safe device 54 and a fusible pellet 56. Fail safe device 54 includes a horizontally extending lower portion 58 having an aperture 60 for slidingly receiving the ground pin 34. An enlarged collar portion 62 of the ground pin engages the lower portion 58 providing an electrical ground connection to the fail safe device 54. A vertically extending upper portion 64 of the fail safe device 54 includes an aperture 66 for locating and retaining the fusible pellet 56 adjacent a hot spot at a predetermined area of the solid state overvoltage device 12. A pair of opposed ends 68 of upper portion 64 are located adjacent to the TIP and RING INPUT pins 26, 28. In the event of overheating of the solid state overvoltage device 12, the fusible pellet 56 establishes a short circuit between the fail safe device 54 and the TIP and RING INPUT pins 26, 28.

A printed wiring board 70 carrying the second overvoltage protection circuitry 21 has a pair of downwardly depending tabs 72 received within openings 74 of the TIP and RING OUTPUT pins 30, 32 for electrical connection with the OUTPUT pins.

Assembly of the overvoltage protection device 10 is best understood with reference to FIGS. 9 and 10. Referring to FIG. 9, the pins 26, 28, 30, 32 and 34 are slidingly received within corresponding apertures 26A, 28A, 30A, 32A and 34A of the base 22. The ground pin 34 is received within the aperture 60 of the fail safe device 54 until the stop collar portion 62 is engaged. TIP and RING INPUT and OUTPUT pins 26, 28, 30 and 32 similarly include an enlarged stop collar portion 76 for locating the TIP and RING INPUT and OUTPUT pins within the base 22. The solid state overvoltage device 12, fail safe member 54 and the fusible pellet 56 are received and positioned within the cavity defined by arms 40 of the base unit 22. The printed wiring board 70 carrying the second overvoltage protection circuitry 21 is electrically connected with the OUTPUT pins 30 and 32 via the tabs 72 received within the pin openings 74. The assembled condition of the overvoltage protection device 10 is illustrated in FIGS. 2–8.

Referring to FIGS. 4 and 8, an aperture 78 in the cover 24 can be aligned with each of the TIP and RING INPUT pins 26 and 28, as shown, providing test access within the cover 24. Apertures 78 can be eliminated depending on the environmental conditions for the overvoltage protection device 10.

Preferably, both the base 22 and the cover 24 of the telephone line overvoltage protection device 10 are a unitary member formed of strong, flexible electrically insulating material. A plastic or similar, synthetic resin material forms both the base 22 and the cover 24 of the telephone line overvoltage protection device 10 by conventional injection molding techniques. Fail safe device 54 is formed of an electrically conductive material, for example, such as, a stamped and formed sheet metal material.

While the invention has been described with reference to details of the illustrated embodiment, these details are not intended to limit the scope of the invention as defined in the appended claims.

I claim:

1. An overvoltage protection apparatus used with a pair of telephone lines comprising:

first voltage clamping means for clamping voltage signals on said lines at a first predetermined voltage potential;

second voltage clamping means for clamping voltage signals on said lines at a second predetermined voltage potential; said second voltage clamping means including filter means for filter said voltage signals when said voltage signals exceed said second predetermined voltage potential;

said first voltage clamping means formed by a solid state protective device and a failure mode mechanism consisting of a fusible pellet and a unitary electrically conductive fail safe member adapted for simultaneously connecting both of said lines to ground responsive to increased temperature of said solid state protective device, whereby balanced grounding operation is provided with respect to said lines;

a first base housing defining a plurality of terminal-pin receiving channels, a pair of INPUT TIP and RING terminal-pins, a pair of OUTPUT TIP and RING terminal-pins, and a ground terminal-pin, each of said terminal-pins received within a corresponding one of said terminal-pin receiving channels;

each of said pair of INPUT TIP and RING terminal-pins, said pair of OUTPUT TIP and RING terminal-pins, and said ground terminal-pin having an enlarged stop collar portion location each of said terminal-pins within said first base housing and each of said terminal-pins having elongated pin portions extending both above and below said first base housing;

said failure mode unitary electrically conductive fail safe member being a stamped and formed member having a base portion supported by said first base housing and defining an aperture receiving said ground terminal-pin in electrical contact engagement; and said failure mode unitary electrically conductive stamped and formed fail safe member having a vertically extending upper portion with a pair of opposed ends located adjacent to said INPUT TIP and RING terminal-pins; and said upper portion having means for locating and retaining said fusible pellet between said solid state protective device and said upper portion.

2. An overvoltage protection apparatus as recited in claim 1 wherein said second voltage clamping means includes current limiting means for limiting current flow in said lines; said current limiting means being temperature responsive.

3. An overvoltage protection apparatus as recited in claim 1 wherein said second voltage clamping means includes a bidirectional voltage suppressor device, resistance means connected in series with said lines and capacitance means connected between said bidirectional voltage suppressor device and said resistance means.

4. An overvoltage protection apparatus as recited in claim 3 wherein said resistance means limits current flow in said lines and is temperature responsive.

5. An overvoltage protection apparatus as recited in claim 4 wherein said temperature responsive resistance means has a positive temperature coefficient.

6. An overvoltage protection apparatus as recited in claim 4 wherein said temperature responsive resistance means is a resistance fuse that open-circuits for current limiting.

7. An overvoltage protection apparatus as recited in claim 1 further includes a second housing arranged for mating engagement with said first base housing and for containing said first and second voltage clamping means.

8. An overvoltage protection device as recited in claim 7 wherein said first base housing and said second housing are formed by injection molding of a synthetic resin material.

9. An overvoltage protection device used with a pair of telephone lines comprising:
   a first base housing defining a plurality of terminal-pin receiving channels;
   a second housing arranged for mating engagement with said first base housing;
   first voltage clamping means connected between a pair of INPUT terminal-pins and a ground terminal-pin for clamping voltage signals on said lines at a first predetermined voltage potential;
   second voltage clamping means connected between said first voltage clamping means and a pair of OUTPUT terminal-pins for clamping voltage signals on said lines at a second predetermined voltage potential; said second voltage clamping means including a bidirectional voltage suppressor device, resistance means connected in series with said lines and capacitance means connected between said bidirectional voltage suppressor device and said resistance means; said pair of INPUT terminal pins, said ground pin and said pair of OUTPUT terminal pins located in said terminal pin receiving channels of said first base housing;
   said first voltage clamping means formed by a solid state protective device and a failure mode mechanism supported by said first base housing, said failure mode mechanism consisting of a fusible pellet and a unitary electrically conductive fail safe member adapted for simultaneously connecting both of said lines to ground with said INPUT terminal-pins responsive to increased temperature of said solid state protective device;
   each of said pair of INPUT terminal-pins, said pair of OUTPUT terminal-pins and said ground terminal-pin received within a corresponding one of said terminal-pin receiving channels;
   each of said pair of INPUT terminal-pins, said pair of OUTPUT terminal-pins, and said ground terminal-pin having an enlarged stop collar portion locating each of said terminal-pins within said first base housing and each of said terminal-pins having elongated pin portions extending both above and below said first base housing;
   said failure mode unitary electrically conductive fail safe member being a stamped and formed member having a base portion supported by said first base housing and defining an aperture receiving said ground terminal-pin in electrical contact engagement; and
   said failure mode unitary electrically conductive stamped and formed fail safe member having a vertically extending upper portion with a pair of opposed ends respectively located adjacent to said pair of INPUT terminal-pins; and said upper portion having means for locating and retaining said fusible pellet between said solid state protective device and said upper portion.

10. An overvoltage protection device as recited in claim 9 wherein said second voltage clamping means includes current limiting, temperature responsive resistance means for limiting current flow in said lines.

11. An overvoltage protection device as recited in claim 10 wherein said temperature responsive reistance means has a positive temperature coefficient.

12. An overvoltage protection device as recited in claim 10 wherein said temperature responsive resistance means is a fuse-type resistor that melts at a predetermined temperature and open-circuits said lines.

13. An overvoltage protection device as recited in claim 9 wherein said fusible pellet melts at a predetermined temperature and simultaneously connects said failure mode unitary electrically conductive stamped and formed fail safe member to said pair of INPUT terminal-pins.

14. An overvoltage protection device as recited in claim 13 wherein said failure mode unitary electrically conductive stamped and formed fail safe member is a stamped and formed sheet metal material.

15. An overvoltage protection device as recited in claim 9 wherein said first base housing and said second housing are formed by injection molding of a synthetic resin, electrically insulative material.

* * * * *